(12) United States Patent
Ahmed

(10) Patent No.: US 12,216,900 B2
(45) Date of Patent: Feb. 4, 2025

(54) ENHANCED SHAPE-BASED KEYBOARD

(71) Applicant: Zeerak Ahmed, Seattle, WA (US)

(72) Inventor: Zeerak Ahmed, Seattle, WA (US)

(*) Notice: Subject to any disclaimer, the term of this patent is extended or adjusted under 35 U.S.C. 154(b) by 0 days.

(21) Appl. No.: 18/340,533

(22) Filed: Jun. 23, 2023

(65) Prior Publication Data

US 2023/0418464 A1 Dec. 28, 2023

Related U.S. Application Data

(60) Provisional application No. 63/355,150, filed on Jun. 24, 2022.

(51) Int. Cl.
*G06F 3/048* (2013.01)
*G06F 3/04886* (2022.01)
*G06F 16/31* (2019.01)
*G06F 40/274* (2020.01)

(52) U.S. Cl.
CPC ........ *G06F 3/04886* (2013.01); *G06F 16/313* (2019.01); *G06F 40/274* (2020.01)

(58) Field of Classification Search
CPC ... G06F 3/04886; G06F 16/313; G06F 40/274
See application file for complete search history.

(56) References Cited

U.S. PATENT DOCUMENTS

| | | | | |
|---|---|---|---|---|
| 10,234,958 | B2* | 3/2019 | Chen | G06F 3/04842 |
| 2008/0005668 | A1* | 1/2008 | Mavinkurve | G06F 16/9577 |
| | | | | 715/764 |
| 2009/0037837 | A1* | 2/2009 | Raghunath | G06F 3/0237 |
| | | | | 715/773 |
| 2009/0262082 | A1* | 10/2009 | Park | G06F 3/04886 |
| | | | | 345/173 |
| 2009/0265669 | A1* | 10/2009 | Kida | G06F 3/04886 |
| | | | | 715/863 |
| 2014/0043239 | A1* | 2/2014 | Agrawal | G06F 3/0236 |
| | | | | 345/169 |
| 2017/0249017 | A1* | 8/2017 | Ryu | G06F 3/018 |
| 2017/0300559 | A1* | 10/2017 | Fallah | G06F 3/04886 |
| 2019/0012077 | A1* | 1/2019 | Noh | G06F 3/0237 |
| 2021/0048893 | A1* | 2/2021 | Noh | G06F 40/274 |
| 2022/0327288 | A1* | 10/2022 | Van Durme | G06F 40/56 |
| 2023/0103441 | A1* | 4/2023 | Kim | H04N 21/4316 |
| | | | | 725/38 |
| 2023/0315217 | A1* | 10/2023 | Loh | G06F 3/04886 |
| | | | | 345/168 |

FOREIGN PATENT DOCUMENTS

WO WO-2010094121 A1 * 8/2010 ............. G06F 3/018

* cited by examiner

*Primary Examiner* — Linh K Pham

(57) ABSTRACT

Disclosed herein are systems and methods for providing an enhanced shape-based keyboard to computing devices with an integrated touch screen display. In an implementation, the computing device displays a first keyboard such that the first keyboard comprises keys that correspond to initial base shapes of an alphabet. Next the computing device receives a first user input comprising a selection of one of the keys of the first keyboard. In response to the first user input, the computing device displays a second keyboard such that the second keyboard comprises keys that correspond to medial base shapes of the alphabet.

20 Claims, 10 Drawing Sheets

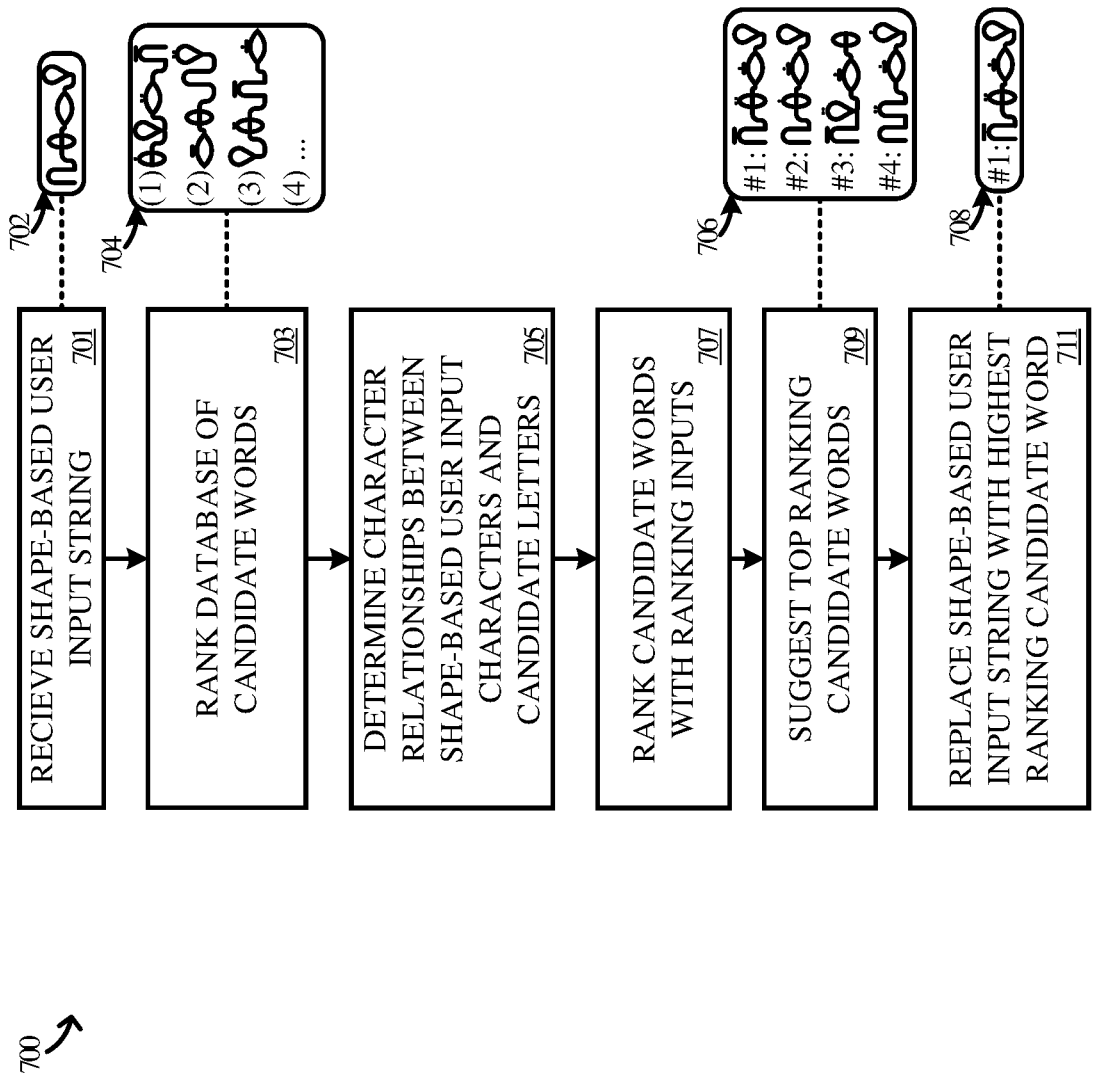

ENHANCED SHAPE-BASED KEYBOARD

TECHNICAL FIELD

Aspects of the disclosure are related to the field of computer software applications and, in particular, to an enhanced shape-based keyboard for digital displays.

BACKGROUND

The revolution of touch screen technologies in today's day and age has only increased the amount of control that a user holds in the interaction between device and person. One of the most important integrations of today's touch screen devices is the inclusion of a touch screen keyboard. This integration not only maximizes the available surface area for the screen on devices (as a physical keyboard is no longer necessary) but opens the door for improvement on the modern-day keyboard.

Current touch screen keyboard designs are heavily oriented towards the roman alphabet. Although common, this design does not accommodate for languages with alternate origins. Alphabets from the roman denomination contain approximately 26 letters, while alphabets from the Arabic denomination (e.g., Urdu) contain at least 39 letters. Thus, the standard touch screen keyboard was not designed to manage alphabets with this higher volume of letters, but rather an alphabet with only 26 letters.

Further limitations of the current keyboard design arise for languages which appear cursive when written. For example, the Arabic script is cursive in nature such that the letters appear visually connected and take on different shapes depending on their location in a word. Current keyboards for languages which use the Arabic script only show letters in their isolated (un-joined) form. As a result, users of these keyboards are unable to visualize the shape of letters when typed, making it difficult to select letters, and correct mistakes.

A typical iOS Urdu keyboard has two parts. As some background Urdu does not differentiate between upper- and lower-case letters. So, unlike the standard keyboard design where the user uses the shift key to differentiate between cases, the iOS Urdu keyboard uses the shift key to alternate between different halves of the alphabet. This "two-part" keyboard the Urdu script requires is highly inconvenient to the user and could be optimized.

On the other hand, keyboards that attempt to contain the entirety of a higher volume alphabet on a singular board (meaning all the letters are presented to the user upfront, rather than the shift key access) are no longer user friendly. First, this higher volume of keys presents issues for the user operating the device as the increased number of keys can lead to a cognitive overload. This hampers new users' ability to learn to type digitally. Secondly, the individual keys can become cramped on these keyboards making it difficult for the user to select their desired letter, especially for those with larger fingers. This cramped keyboard may also challenge some user's vision as the keys can be displayed in a condensed state. So, although this cramped keyboard style is possible, it is not practical.

SUMMARY

Technology is disclosed herein that provides an enhanced shape-based keyboard to computing devices with an integrated touch screen display. Various implementations include a computer implemented method for providing the enhanced shape-based keyboard. Processing circuitry of a suitable computer displays a first keyboard such that the first keyboard comprises keys that correspond to initial base shapes of an alphabet. Next, the processing circuitry receives a first user input comprising a selection of one of the keys of the first keyboard. In response to the first user input, the processing circuitry displays a second keyboard such that the second keyboard comprises keys that correspond to medial base shapes of the alphabet.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 7 illustrates another method for employing an enhanced shape-based keyboard with an autocomplete algorithm in an implementation.

DETAILED DESCRIPTION

Figure 1A:
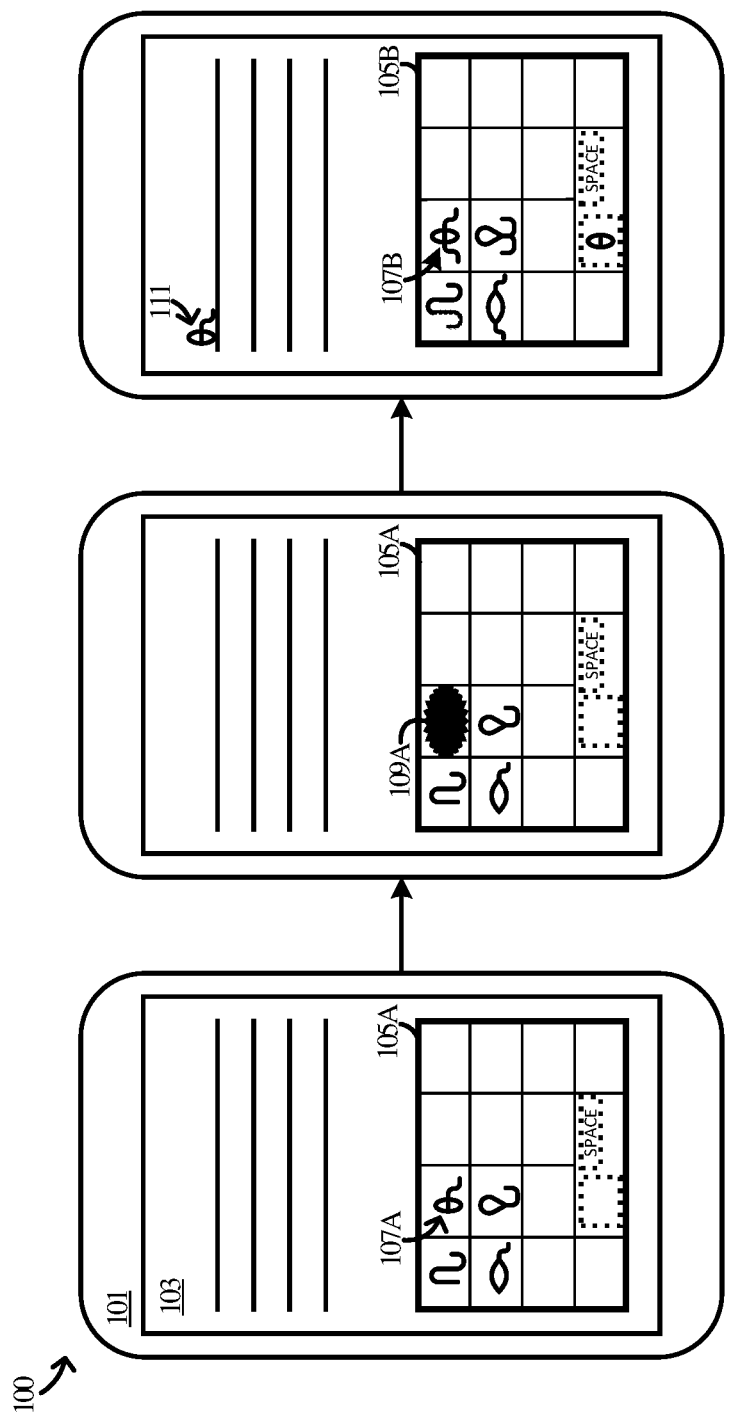
FIGS. 1A-1B illustrate a technical environment for an enhanced shape-based keyboard in an implementation.

Various implementations are disclosed herein that describe the operation of an enhanced shape-based keyboard that integrates an adaptability functionality and an autocomplete algorithm for varying computing devices. Such devices may include but are not limited to a phone, tablet, laptop, or any other device that displays a touch screen keyboard. Further implementations can include devices without a touch screen display wherein a physical keyboard is provided for the device such that the individual keys of said keyboard are mapped to a virtual enhanced shape-based keyboard within the device.

In an implementation, the enhanced shape-based keyboard displays a compressed keyboard layout where the individual keys of the keyboard display the base shapes of the desired lexicon. Base shapes describe characters without accents or additional markers to represent their character. For example, in languages that use the Arabic script, (e.g., Arabic, Urdu, Sindhi, Pashto, Farsi, etc.), the letters "پ", "ب", and "ت" share the same base shape, "ب". Thus, a shape-based keyboard minimizes the number of keys physically required on the keyboard as only the base shapes of the chosen script are displayed. In an implementation, the user may access accented characters by triggering a pop-up menu of all the available accent options for a desired base-shape.

In an implementation, the enhanced shape-based keyboard includes an adaptability functionality. The adaptability functionality allows the enhanced shape-based keyboard to adapt the shape of the presented keys based on the current user input. In cursive scripts, the shape of a letter will change depending on the letter's placement in a word. Meaning, each letter has a different character shape, including shapes for when the letter connects to a subsequent letter, a proceeding letter, both a subsequent and preceding letter, or neither a subsequent or preceding letter. Groups of joined letters are referred to as a grapheme. In the context of a grapheme, letters may be in an initial, medial, final, or isolated position. Letters in an initial position begin a grapheme and consist of character shapes that may only connect with a subsequent letter. Letters in a medial position neither start, nor end a grapheme, but are in the middle. Letters in the medial position consist of character shapes that may connect to both the preceding and subsequent letters. Letters in a final position end a grapheme and consist of character shapes that may only connect with a preceding letter. Letters in an isolated form have no other letters in the same grapheme and consist of character shapes without connections to any other letters. Further adaptations of letters can be included in these lexicons, such that the shape of a letter is dependent on the combination of letters within the word.

In an implementation, there are two adaptations the enhanced shape-based keyboard's adaptability functionality can take on. First, the enhanced shape-based keyboard may adapt to an initial shape-based keyboard. The initial shape-based keyboard comprises keys that display the initial base shapes of the desired lexicon. In an implementation, the initial shape-based keyboard is displayed to the user when either no user input has been entered, the user has indicated the completion of their input, or the preceding letter (within the context of the user inputted message) does not join to subsequent letters. In an implementation, the user may indicate the completion of their input with a selection of either the space key or an ending key.

The second adaptation of the enhanced shape-based keyboard's adaptability functionality includes a medial shape-based keyboard. The medial shape-based keyboard comprises keys that display the medial version of the base shapes as seen on the initial shape-based keyboard. In an implementation, the medial shape-based keyboard is displayed to the user after receiving a user input character and continues to be displayed until no longer required. Meaning, the adaptability functionality of the enhanced shape-based keyboard displays the medial shape-based keyboard when the initial shape-based keyboard is not required.

In an implementation, throughout the interaction between the user and the interface, the adaptability functionality of the enhanced shape-based keyboard will adapt the shape of both the characters on the keyboard as well as the characters of the user input. Prior to receiving any input from the user, the enhanced shape-based keyboard presents the initial shape-based keyboard. Once the user inputs their first initial shape-based character the compressed keyboard will adapt to the medial shape-based keyboard. As the user continues to input characters both the keyboard and the characters will remain in the medial representation. Once the user has completed their desired string, the user can indicate this action with the selection of the space key. Upon this indication the final character of the user input string will adapt from its medial shape-based representation to its final shape-based representation. Simultaneously this indication converts the medial shape-based keyboard back to the initial shape-based keyboard. In further implementations, other keys besides the space key may also indicate the completion of user input such that the enhanced shape-based keyboard performs the same actions as described in the earlier implementation.

As an example, if a user desired to input a five-letter word, they would first be presented with the initial shape-based keyboard. Once the user selects the first character of their word, the keyboard will adapt to the medial-shape based keyboard. The next four characters of the word will then be inputted as medial shape-based characters. Once the user indicates the completion of this input, the fifth character of the word will adapt to its final shape-based character representation, while the medial shape-based keyboard converts back to the initial shape-based keyboard.

In an implementation, the enhanced shape-based keyboard includes an autocomplete algorithm. The autocomplete algorithm compares received user input to a database of words to generate a set of possible candidate words for the received user input. As the received user input is a shape-based representation of a word, the autocomplete algorithm will provide candidate words to replace the shape-based user input string. In an implementation, the autocomplete algorithm suggests the top-ranking candidate words to the user and replaces the user input string with the highest-ranking candidate word based on a set of ranking inputs. In an implementation, the autocomplete algorithm utilizes four ranking inputs to determine the set of candidate words that best compare to the received user input.

The first ranking input is a word match level. The word match level is indicative of the numbers of letters within the candidate word that either closely or exactly match the characters of the shape-based user-input string. Determining the word match level is done through a sequential process, where the autocomplete algorithm compares each character of the shape-based user input string to the corresponding letter of the candidate word. For example, if the user inputted a four-character long shape-based string, the autocomplete algorithm would compare the first character of the string with the first letter of a candidate word. This is followed by the second character of the string being compared to the second letter of the candidate word and so on.

The second ranking input describes the character relationships between the characters of the shape-based user input string and the letters of the candidate words. Determining the character relationships is done through a similar sequential process, such that the autocomplete algorithm compares each character of the shape-based user input string to the corresponding letter of the candidate word. In an implementation, the autocomplete algorithm utilizes five distinctive character relationships to determine the strength between the characters of the user shape-based input string and the letters of the candidate word.

The first character relationship the autocomplete algorithm can determine between the candidate letter and the shape-based user input character is an exact relationship. The autocomplete algorithm identifies the exact relationship when the candidate letter matches the shape of the shape-based user input character.

The second character relationship is the physical relationship. The autocomplete algorithm identifies the physical relationship when the candidate letter matches the shape of the keys in closest proximity to the shape-based user input character. This relationship was designed for human error as the user may unintentionally choose the wrong shape-based character when inputting their desired shape-based input string.

The third character relationship is an aural relationship. The autocomplete algorithm identifies the aural relationship when the candidate letter matches the sound of the shape-based user input character. This relationship was designed for when the user is unsure how to spell their desired word and thus attempt to input a phonetic representation of the word. For example, in the English lexicon, if the user wanted to input the word "certificate" and were unsure how to spell it, they may input a phonetic representation such as, "sertificate". In this example the autocomplete algorithm would then take the user input "sertificate" and replace it with the correct spelling.

The fourth character relationship the autocomplete algorithm can determine is a physical aural relationship. The autocomplete algorithm identifies the physical aural relationship when the candidate letter matches the sound of the keys in close proximity to the shape-based user input character. This relationship is like the physical relationship, but with the added aural component.

The fifth, and last, character relationship the autocomplete algorithm can identify is a null relationship. The autocomplete algorithm identifies the null relationship when the candidate letter shares no relation with the shape-based user input character. In an implementation, the autocomplete algorithm uses the character relationships to determine the character relationship ranking input.

The next ranking input the autocomplete algorithm utilizes is a proximity input. The proximity input examines the physical locations on the screen that the user has pressed.

The final ranking input the autocomplete algorithm utilizes is the frequency input. The frequency input analyzes the frequency of the candidate word in a known lexicon both independently as well as within the context of the typed string. For instance, more commonly used candidate words would be considered a higher match than more abstract candidate words.

In an implementation, after the autocomplete, algorithm has determined the rankings of the candidate words, the autocomplete algorithm then replaces the shape-based user input string with the candidate word that was ranked highest. The autocomplete algorithm also suggests to the user other candidate words that ranked high in case the autocomplete algorithm was unable to initially identify the desired user input. The user can select these alternate candidate words, if the original replacement was incorrect.

It may be appreciated that the compressed layout of the enhanced shape-based keyboard may be implemented individually such that the adaptability functionality and autocomplete algorithm are not included. For example, the compressed shape-based layout may be integrated into either the physical or virtual keyboard such that the keyboard is displayed on a touch screen, or a physical keyboard is mapped to a virtual layout. Either way both implementations do not require the adaptability function or the autocomplete algorithm. The compressed layout of a shape-based keyboard allows for the increased size of the physical keys as less keys are required in the shape-based format. This reaps multiple benefits for the user as the increased size improves the character visibility, as well as the physical access to the key.

In further implementations the compressed layout of the shape-based keyboard may also be singularly integrated with either the adaptability functionality or the autocomplete algorithm. Thus, these implementations may include a compressed adaptable shape-based keyboard or a compressed shape-based keyboard with an autocomplete algorithm functionality respectively.

Implementations of the technology will now be described in detail with reference to several implementations illustrated in the accompanying drawings. In the following description numerous specific details are set forth such that they provide a thorough understanding of the implementations of the technology. In other instances, well known process steps and/or structures may not be described in detail in order to not unnecessarily obscure the technology.

FIG. 1A illustrates a technical environment for an enhanced shape-based keyboard, herein referred to as environment 100. Environment 100 includes computing device 101, such that environment 100 displays computing device 101 under various conditions. Computing device 101 includes—but is not limited to—touch screen display 103. Touch screen display 103 is representative of the screen which displays the enhance shape-based keyboard. In an implementation, computing device 101 is equipped with software that supplies the enhanced shape-based keyboard to touch screen display 103.

The enhanced shape-based keyboard of touch screen display 103 is represented by initial shape-based keyboard 105A and medial shape-based keyboard 105B. In an implementation, touch screen display 103 will display initial shape-based keyboard 105A or medial shape-based keyboard 105B based on the user input.

Prior to any user input, touch screen display 103 presents the user with initial shape-based keyboard 105A. Initial shape-based keyboard 105A comprises of a set of initial shape-based keys, including initial shape-based key 107A. Upon receiving user input 109A of initial shape-based key 107A, initial shape-based keyboard 105A adapts to medial shape-based keyboard 105B. Medial shape-based keyboard 105B comprises a corresponding set of medial shape-based keys. For example, medial shaped-based key 107B of medial shape-based keyboard 105B is the medial representation of initial shape-based key 107A. In addition to displaying medial shape-based keyboard 105B, upon receiving user input 109A, touch screen display 103 displays initial shape-based character 111.

Figure 1B:
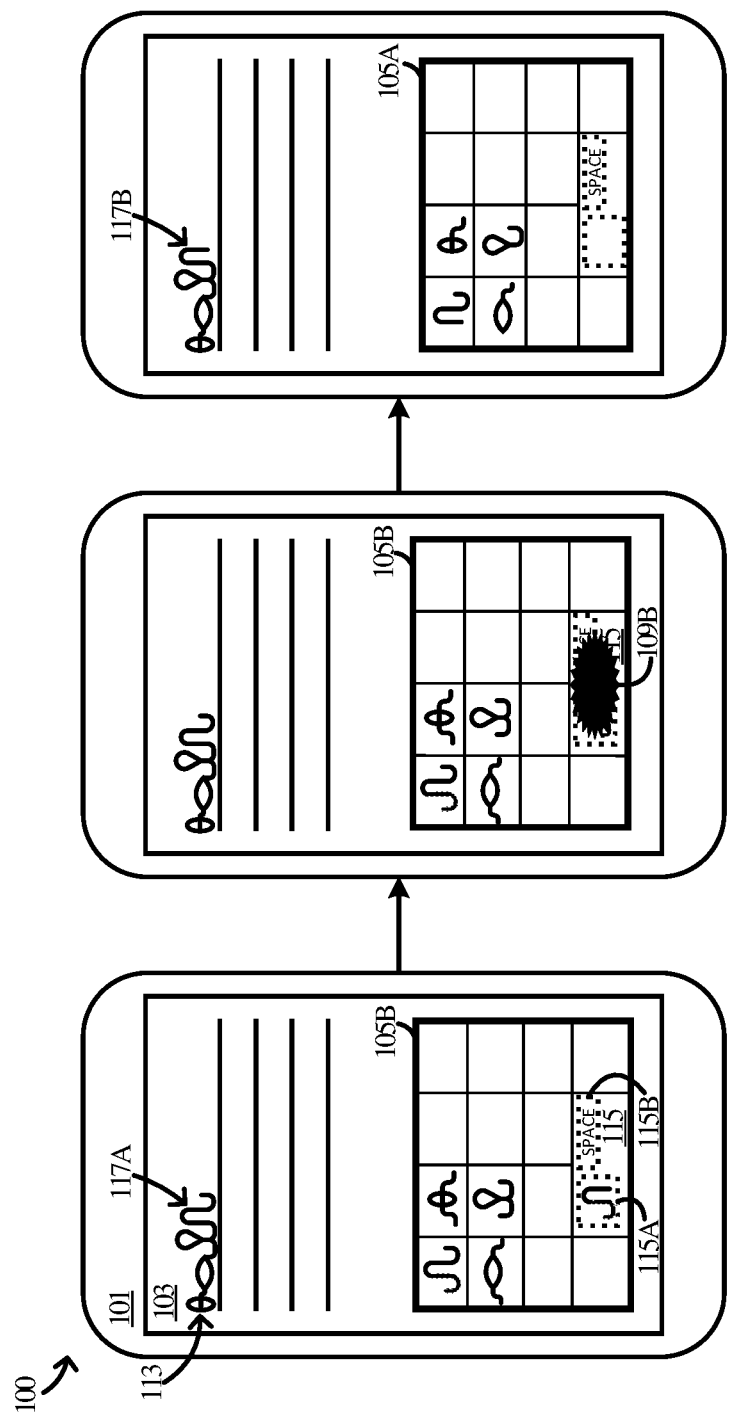

Turning to FIG. 1B, environment 100 illustrates computing device 101, now displaying user input string 113. User input string 113 is comprised of four shape-based characters such that the first character displays an initial representation of the character, followed by medial representations of the subsequent characters, including medial shape-based character 117A. When a user is satisfied with their input string, the user indicates they have completed their input through the selection of ending key 115.

Ending key 115 includes final-representation key 115A. Final representation key 115A depicts the final shape-based representation of the last shape-based character entered by the user (i.e., medial shape-based character 117A). In an implementation, final representation key 115A depicts the isolated shape-based character representation. When selected, via user input 109B, final representation key 115A converts medial character representation 117A to final character representation 117B. Further, selection of final representation key 115A converts medial shape-based keyboard 105B back to initial shape-based keyboard 105A.

Ending key 115 further includes space key 115B. When selected, via user input 109B, space key 115B inputs a space after user input string 113 and converts medial character representation 117A to final character representation 117B. Further, selection of space key 115B converts medial shape-based keyboard 105B back to initial shape-based keyboard 105A.

In an implementation, other special keys may also be used to similarly end character input, change the shape of the last entered character from medial to final, and adapt the keyboard to an initial shape layout. One such key is the zero-width non-joiner key, which ends a grapheme without entering an explicit space character.

Figure 2:
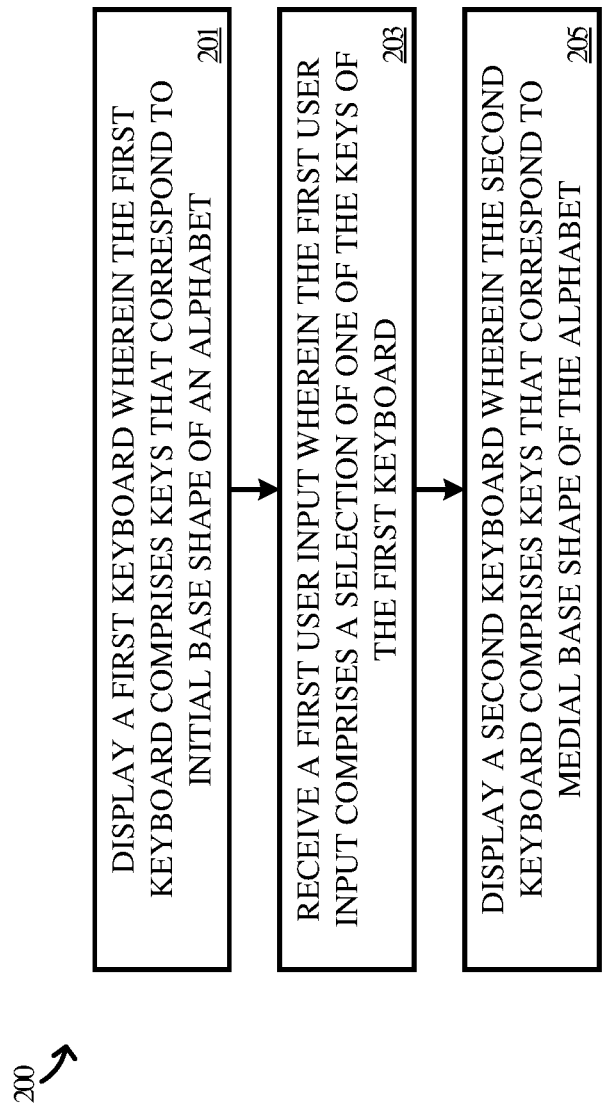
FIG. 2 illustrates a process for employing an enhanced shape-based keyboard with an adaptability functionality in an implementation.

FIG. 2 illustrates process 200 for employing an enhanced shape-based keyboard with an adaptability functionality. Process 200 may be implemented in the context of program instructions that, when executed by a suitable processing system (i.e., computing device 101), direct the processing system to operate as follows, referring parenthetically to the steps in FIG. 2.

To begin, the processing system displays a first keyboard to a user, such that the first keyboard is representative of an initial shape-based keyboard (step 201). Next, the processing system receives a first user input of an initial shape-based character from the initial shape-based keyboard (step 203). In response, to the first user input, the processing system displays a second keyboard such that the second keyboard is representative of a medial shape-based keyboard (step 205).

In an implementation, the processing system continues to display the medial shape-based keyboard until the user indicates completion of their input. Users may either select the space key, or an ending key to indicate completed input. In an implementation the ending key displays the last character entered by the user in a final shape-based representation. Upon indication that the user has completed their input, the processing system will return to the first keyboard so that process 200 can restart.

Referring back to FIG. 1A, the following describes a brief example of process 200 applied in the context of computing device 101. Computing device 101 first displays initial shape-based keyboard 105A. Next, computing device 101 receives user input 109A of initial shape-based key 107A. In response, computing device 101 converts initial shape-based keyboard 105A to medial shape-based keyboard 105B. Process 200 may restart when the user has indicated to computing device 101 that they have completed their input.

Figure 3:
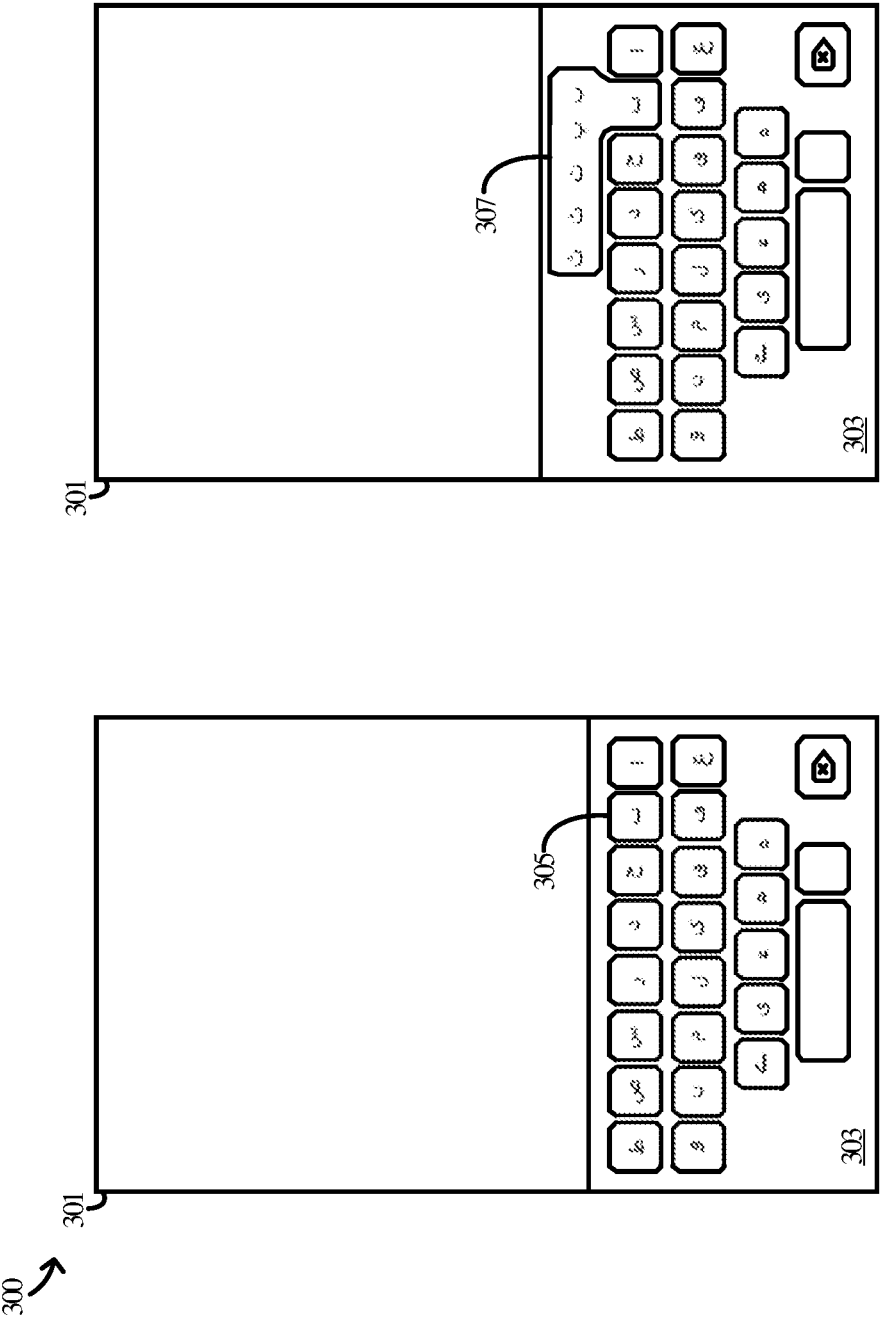
FIG. 3 illustrates an environment for an enhanced shape-based keyboard in an implementation.

FIG. 3 illustrates environment 300 for selecting an accented character. Environment 300 includes computing device 301. Computing device 301 is representative of a device that may employ the enhanced shape-based keyboard. Computing device 301 includes enhanced shape-based keyboard 303. Enhanced shape-based keyboard 303 displays the base shapes of a lexicon, such that the keyboard includes shape-based key 305.

In an implementation if the user desired to select an accented version of shape-based key 305, the user can press and hold shape-based key 305 to trigger pop-up menu 307. Pop-up menu 307 displays each available accented letter corresponding to shape-based key 305. The user is then allowed to select the accented letter of their choice from pop-up menu 307. In an implementation, each key of enhanced shape-based keyboard 303 that has further accents includes a corresponding pop-up menu. In an implementation, the pop-up menu to select accented versions of characters may be produced by another interaction, such as a mouse click. A similar interaction can be used to add further accents, such as diacritics that indicate vowelization.

Figure 4:
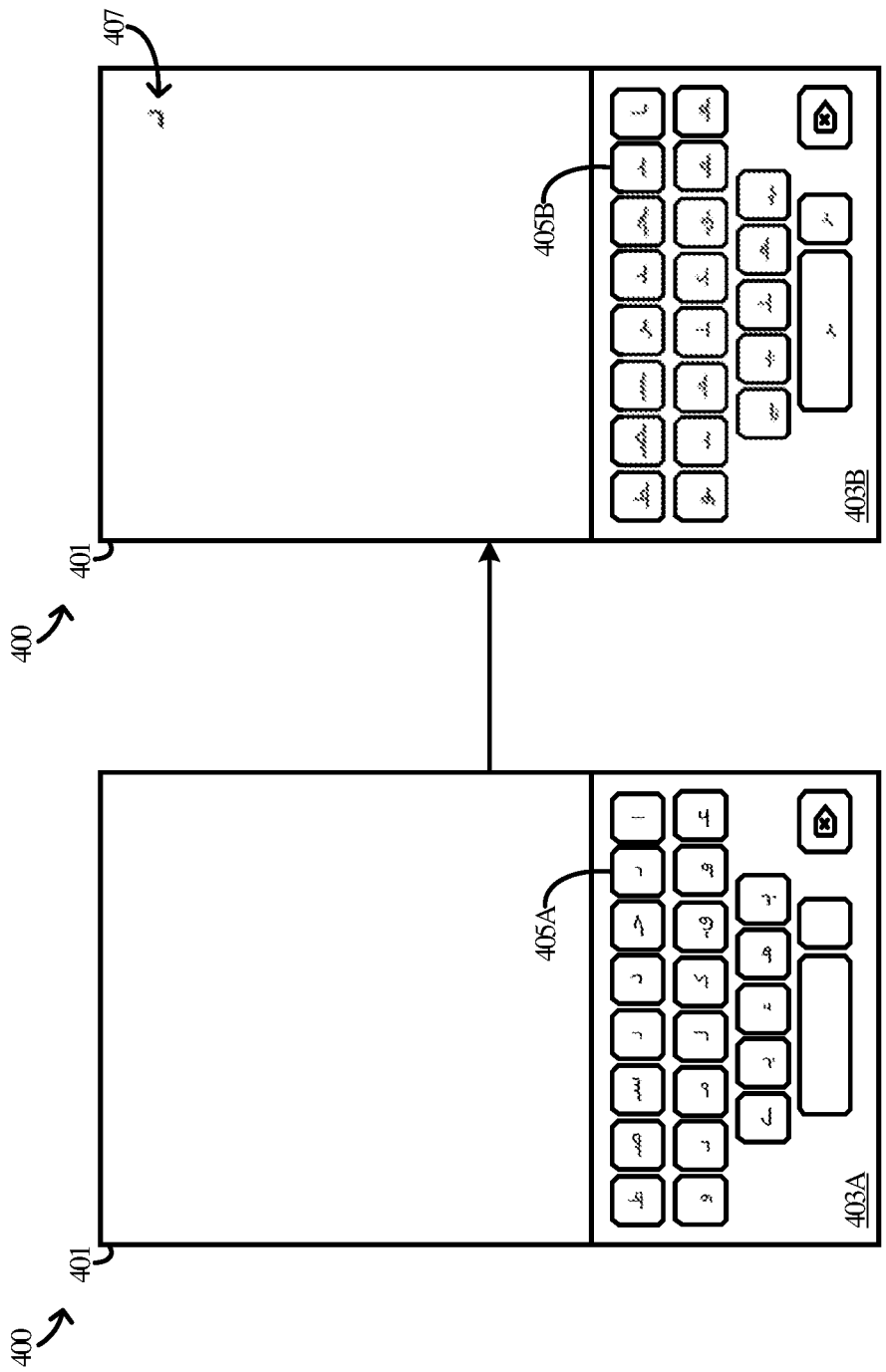
FIGS. 4A-4B illustrate another technical environment for the enhanced shape-based keyboard in an implementation.

FIGS. 4A and 4B illustrate another technical environment for an enhanced shape-based keyboard, herein referred to as environment 400. Environment 400 includes mobile device 401, such that environment 400 displays mobile device 401 under various conditions. Mobile device 401 is representative of any mobile device that employs a touch screen. For example, such mobile devices may include iOS devices, Android devices, or devices of the like. Further, mobile device 401 may be representative of computing device 101 of FIGS. 1A and 1B. In an implementation, mobile device 401 is equipped with software that supplies the enhanced shape-based keyboard.

The enhanced shape-based keyboard employed by mobile device 401 is represented by initial shape-based keyboard 403A (i.e., initial shape-based keyboard 105A) and medial shape-based keyboard 403B (i.e., medial shape-based keyboard 105B). When the enhanced shape-based keyboard has received no user input, mobile device 401 displays initial shape-based keyboard 401A. If the user selects initial shape-based key 405A, then mobile device 401 will display initial shape-based character 407. This character selection also leads to the adaptation of initial shape-based keyboard 403A to medial shape-based keyboard 403B, such that the medial representation of initial shape-based key 405A is depicted by medial shape-based key 405B.

Figure 5:
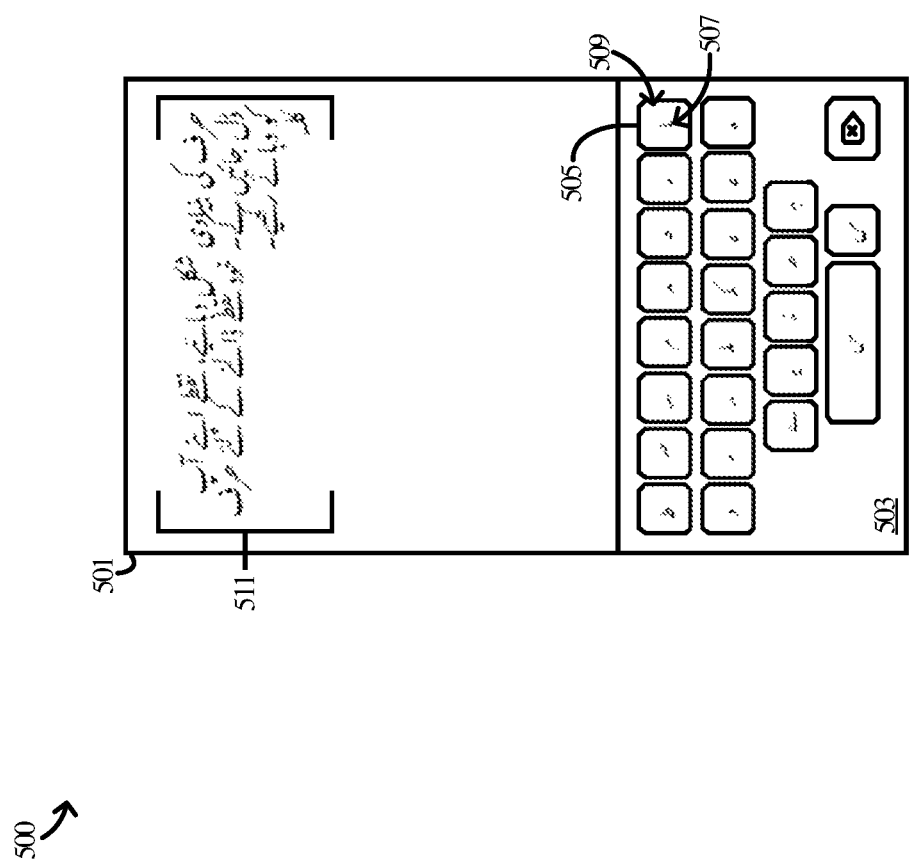
FIG. 5 illustrates another environment for an enhanced shape-based keyboard in an implementation.

FIG. 5 illustrates environment 500 for an enhanced shape-based keyboard with shadow keys. Environment 500 includes computing device 501, representative of any device which integrates a touch screen keyboard. Computing device 501 includes enhanced shape-based keyboard 503. Enhanced shape-based keyboard 503 is representative of a keyboard that displays the base shapes of a lexicon as well as a shadow representation of the last text entered by the user. For example, shape-based key 505 displays shape-based character 507 and shadow 509. Shadow 509 is a shadow representation of message 511, such that shadow 509 represents as many characters from message 511 as shape-based key 505 allots.

In an implementation, shape-based key 505 anticipates how the input of said key would be displayed when connected to the final character of message 511. For example, shape-based character 507 of shape-based key 505 may reflect the font/calligraphic style of the text when output to message 511. This allows the user to view how the input of shape-based character 507 would display in the context of message 511.

Figure 6A:
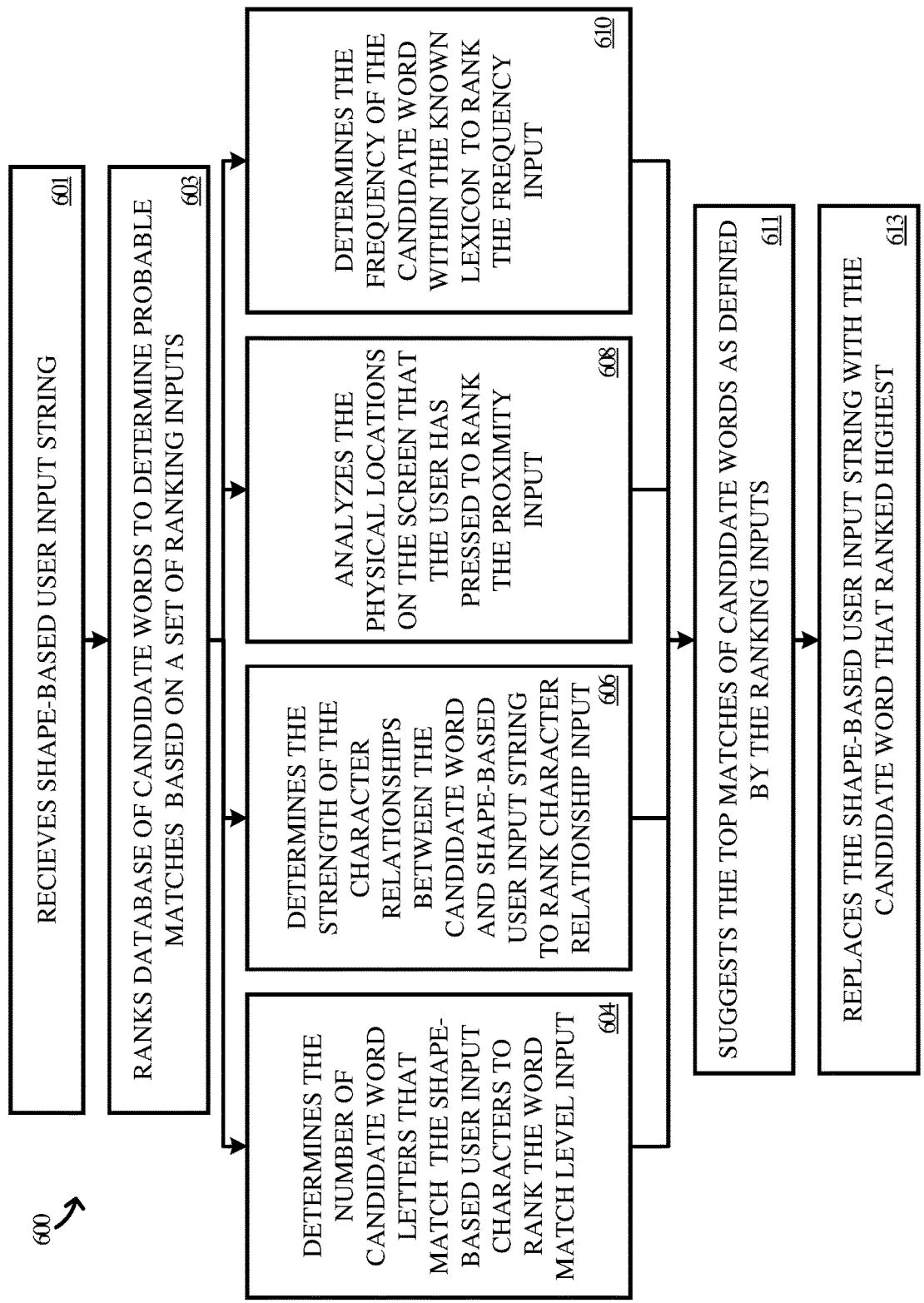
FIGS. 6A-6B illustrate a method for employing an enhanced shape-based keyboard with an autocomplete algorithm in an implementation.
Figure 6B:
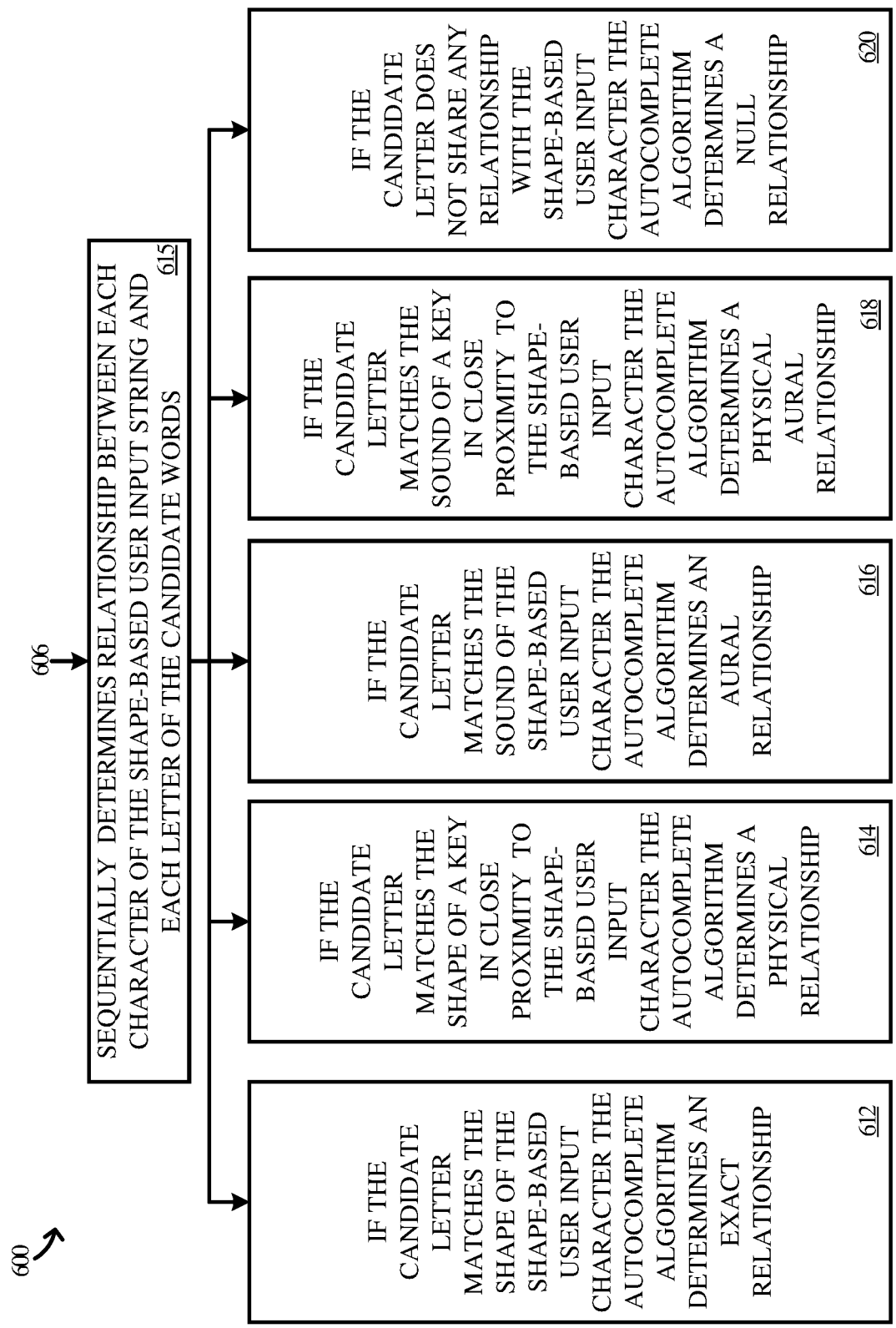

FIGS. 6A and 6B illustrate method 600 for employing the enhanced shape-based keyboard's autocomplete algorithm. Method 600 may be implemented in the context of program instructions that, when executed by a suitable processing system (e.g., computing device 101), direct the processing system to operate as follows, referring parenthetically to the steps in FIGS. 6A and 6B.

To begin, the processing system receives a shape-based user input string (step 601). In response, the processing system employs the autocomplete algorithm to rank a database of candidate words to determine probable matches for the shape-based user input string (step 603). To rank the database of candidate words the autocomplete algorithm examines the candidate words against the following ranking inputs.

First the autocomplete algorithm determines a word match level between the candidate word and the shape-based user input string (step 604). To determine the word match level, the autocomplete algorithm measures the number of letters within the candidate word that match the shape-based user input string. Meaning, the autocomplete algorithm examines both the shape of the characters within the shape-based user input string as well as the layers of accents if any were added by the user (as detailed in FIG. 3).

Second, the autocomplete algorithm examines the strength of the character relationships between the candidate word and the shape-based user input string (step 606). Details to determine the character relationship ranking input are discussed with reference to FIG. 6B.

Next the autocomplete algorithm examines the proximity of the physical locations on the screen that the user pressed against the letters of the candidate words (step 608). The proximity input ranks the letters within the candidate words as higher if they fall closer in range to where the user physically selected. While candidate letters that are further away in proximity to where the user physically selected are ranked lower.

Finally, the autocomplete algorithm evaluates the frequency of the candidate word within the known lexicon (step 610). Words that appear more frequently are ranked higher than words that appear to be uncommon.

Upon ranking the candidate words against the set of ranking inputs, the autocomplete algorithm then suggests the top matches of candidate words as defined by the ranking inputs to the user (step 611). This is followed by the replacement of the highest-ranking candidate word with the user shape-based string (step 613). If the autocomplete algorithm is unable to correctly identify the user's intentions, then the user can examine the alternate high-ranking candidate words for replacement.

FIG. 6B illustrates a detailed process on how the autocomplete algorithm determines the strength of character relationships (step 606). To begin, the autocomplete algorithm directly compares each candidate word with the shape-based user input string. This comparison is done through a sequential process where each letter of the candidate word is compared to a corresponding character of the shape-based user input string to determine the character relationships between each candidate word letter and each shape-based user input string character (step 615).

There are a total of five predefined character relationships that the candidate letter and the shape-based user input string can share. The first is an exact relationship where the candidate word letter matches the shape of the shape-based user input character (step 612). The second is a physical relationship where the shape of the candidate letter matches the shape of the keys in close proximity to the shape-based user input character (step 614). The third character relationship that a candidate letter and shape-based character can share is the aural relationship where the candidate letter matches the sound of the shape-based user input character (step 616). The fourth relationship is a combination of relations two and three and is referred to as the physical aural relationship where the candidate letter matches the sound of the keys in close proximity to the shape-based user input character (step 618). The fifth and final relationship is the null relationship wherein the candidate letter and shape-based user input character share no common qualities (step 620).

Upon defining the character relationships between each candidate word and the shape-based user input string, the autocomplete algorithm can then determine the strength of these character relationships in order to define the character relationship ranking input of the candidate word as completed in step 606 of FIG. 6A. Candidate words that primarily share the first four defined character relationships are ranked strongly as compared to candidate words that primarily share a null relationship. This defined set of character relationships allows the autocomplete algorithm to best predict the intentions of the user's original shape-based input.

FIG. 7 illustrates another method for employing the enhanced shape-based keyboard's autocomplete algorithm, herein referred to as method 700. Method 700 may be implemented in the context of program instructions that, when executed by a suitable processing system (e.g., computing device 101), direct the processing system to operate as follows, referring parenthetically to the steps in FIG. 7.

To begin, the processing system receives shape-based user input string 702 (step 701). In response, the processing system employs the autocomplete algorithm to rank database 704 (step 703). Database 704 is representative of the database of candidate words the autocomplete algorithm ranks against shape-based user input string 702. To rank the database of candidate words the autocomplete algorithm first determines the strength of character relationships between shape-based user input string 702 and the letters of candidate words from database 704 as detailed in FIG. 6B (step 705).

Next the autocomplete algorithm ranks the candidate words based on the ranking inputs as defined in FIG. 6A (step 707). The autocomplete algorithm then suggests a set of top-ranking candidate words 706 to the user (step 709). This is finished with the autocomplete algorithm replacing shape-based user input string 702 with highest-ranking candidate word 708 from the set of top-ranking candidate words 706 (step 711).

Figure 8:
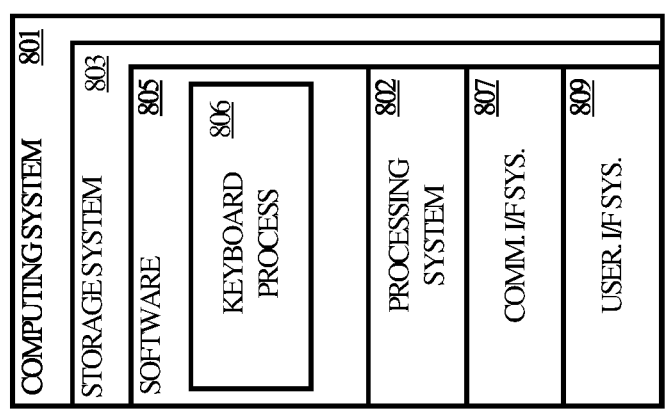
FIG. 8 illustrates a computing system suitable for implementing the various operational environments, architectures, processes, scenarios, and sequences discussed below with respect to the other Figures.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements keyboard process 806, which is (are) representative of the keyboard processes discussed with respect to the preceding Figures, such as process 200, method 600, and method 700. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller capable of communicating with processing system 802 or possibly other systems.

Software 805 (including keyboard process 806) may be implemented in program instructions and among other functions may, when executed by processing system 802, direct processing system 802 to operate as described with respect to the various operational scenarios, sequences, and processes illustrated herein. For example, software 805 may include program instructions for implementing a keyboard process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support adaptive keyboards in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a computing device, the method comprising:
   on the computing device determining to display a first keyboard, wherein the first keyboard includes keys that depict initial base shapes of an Arabic alphabet;
   on the computing device receiving a first user input wherein the first user input comprises a selection of one of the keys of the first keyboard;
   after receiving the first user input, on the computing device populating a text display with a first initial base shape corresponding to the one of the keys of the first keyboard; and
   subsequent to populating the text display, on the computing device determining to adapt the first keyboard to a second keyboard wherein the second keyboard includes keys that depict medial base shapes of the Arabic alphabet.

2. The method of claim 1 further comprising:
   on the computing device receiving a second user input wherein the second user input comprises a selection of a termination key of the second keyboard; and
   in response to the second user input, on the computing device determining to adapt the second keyboard to the first keyboard.

3. The method of claim 2 wherein the termination key of the second keyboard includes one of either a spacebar key or an ending key of the second keyboard.

4. The method of claim 1, wherein the initial base shapes and the medial base shapes comprise letter representations, and wherein the letter representations include letters of the Arabic alphabet without additional accents.

5. The method of claim 1, further comprising:
   on the computing device receiving a shape-based user input string;
   on the computing device ranking a database of candidate words against the shape-based user input string wherein ranking the database of candidate words is based on a set of ranking inputs; and
   on the computing device replacing the shape-based user input string with a highest-ranking candidate word.

6. The method of claim 5 wherein the set of ranking inputs include:
   a word match input;
   a proximity input;
   a frequency input; and
   a character relationship input wherein the character relationship input describes five types of character relationships, and wherein the five types of character relationships include:
      an exact relationship;
      a physical relationship;
      an aural relationship;
      a physical aural relationship; and
      a null relationship.

7. The method of claim 1, wherein the keys of the first keyboard and the keys of the second keyboard further depict a shadow shape, and wherein the shadow shape is representative of a last user input.

8. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
      determine to display a first keyboard, wherein the first keyboard includes keys that depict initial base shapes of an Arabic alphabet;
      receive a first user input wherein the first user input comprises a selection of one of the keys of the first keyboard;
      after receiving the first user input, populate a text display with a first initial base shape corresponding to the one of the keys of the first keyboard; and
      subsequent to populating the text display, determine to adapt the first keyboard to a second keyboard wherein the second keyboard includes keys that comprise medial base shapes of the Arabic alphabet.

9. The computing apparatus of claim 8 wherein the program instructions further direct the computing apparatus to:
   receive a second user input wherein the second user input comprises a selection of a termination key of the second keyboard; and
   in response to the second user input, determine to adapt the second keyboard to the first keyboard.

10. The computing apparatus of claim 9 wherein the termination key of the second keyboard includes one of either a spacebar key or an ending key of the second keyboard.

11. The computing apparatus of claim 8 wherein the initial base shapes and the medial base shapes comprise letter representations, and wherein the letter representations include letters of the Arabic alphabet without additional accents.

12. The computing apparatus of claim 8 wherein the program instructions further direct the computing apparatus to:
   receive a shape-based user input string;
   rank a database of candidate words against the shape-based user input string wherein ranking the database of candidate words is based on a set of ranking inputs; and
   replace the shape-based user input string with a highest-ranking candidate word.

13. The computing apparatus of claim 12 wherein the set of ranking inputs include:
   a word match input;
   a proximity input;
   a frequency input; and
   a character relationship input wherein the character relationship input describes five types of character relationships, and wherein the five types of character relationships include:
      an exact relationship;
      a physical relationship;
      an aural relationship;
      a physical aural relationship; and
      a null relationship.

14. The computing apparatus of claim 8, wherein the keys of the first keyboard and the keys of the second keyboard further depict a shadow shape, and wherein the shadow shape is representative of a last user input.

15. A computing apparatus comprising:
one or more non-transitory computer-readable storage media;
program instructions stored on the one or more non-transitory computer-readable storage media that, when executed by one or more processors of a computing device, direct the computing device to at least:
determine to display a first keyboard, wherein the first keyboard includes keys that depict initial base shapes of an Arabic alphabet;
receive a first user input wherein the first user input comprises a selection of one of the keys of the first keyboard;
after receiving the first user input, populate a text display with a first initial base shape corresponding to the one of the keys of the first keyboard; and
subsequent to populating the text display, determine to adapt the first keyboard to a second keyboard wherein the second keyboard includes keys that comprise medial base shapes of the Arabic alphabet.

16. The computing apparatus of claim 15 wherein the program instructions further direct the computing device to:
receive a second user input wherein the second user input comprises a selection of a termination key of the second keyboard; and
in response to the second user input, determine to adapt the second keyboard to the first keyboard.

17. The computing apparatus of claim 15 wherein the initial base shapes and the medial base shapes comprise letter representations, and wherein the letter representations include letters of the Arabic alphabet without additional accents.

18. The computing apparatus of claim 15 wherein the program instructions further direct the computing device to:
receive a shape-based user input string;
rank a database of candidate words against the shape-based user input string wherein ranking the database of candidate words is based on a set of ranking inputs; and
replace the shape-based user input string with a highest-ranking candidate word.

19. The computing apparatus of claim 18 wherein the set of ranking inputs include:
a word match input;
a proximity input;
a frequency input; and
a character relationship input wherein the character relationship input describes five types of character relationships, and wherein the five types of character relationships include:
an exact relationship;
a physical relationship;
an aural relationship;
a physical aural relationship; and
a null relationship.

20. The computing apparatus of claim 15, wherein the keys of the first keyboard and the keys of the second keyboard further depict a shadow shape, and wherein the shadow shape is representative of a last user input.

\* \* \* \* \*